Dec. 17, 1935.   J. C. McCUNE   2,024,653
QUICK ACTION VALVE
Filed May 19, 1932

INVENTOR.
JOSEPH C. McCUNE.

By *Wm. M. Cady*

ATTORNEY.

Patented Dec. 17, 1935

2,024,653

UNITED STATES PATENT OFFICE 2,024,653

QUICK ACTION VALVE

Joseph C. McCune, Edgewood, Pa., assignor to The Westinghouse Air Brake Company, Wilmerding, Pa., a corporation of Pennsylvania Application May 19, 1932, Serial No. 612,258

10 Claims. (Cl. 303—82)

This invention relates to fluid pressure brakes and more particularly to means for effecting quick serial action through the brake pipe of an automatic fluid pressure brake system.

It is highly desirable that the quick action means which is employed to effect a local reduction in brake pipe pressure shall respond as quickly as possible to a sudden reduction in brake pipe pressure initiated in effecting an emergency application of the brakes, since on a long train the brakes are liable to be applied on cars at the head end of the train so much in advance of the application of the brakes at the rear end of the train as to cause the running in of the slack at such a rate as to occasion severe shocks.

An object of the invention is to provide an improved quick action means whereby the speed of serial quick action transmission is materially increased, thereby reducing the time delay in effecting application of the brakes on the rear cars of the train.

In order to obtain a more rapid serial quick action in effecting an emergency application of the brakes throughout a long train, I employ means such as a Venturi tube, operated by the flow of fluid through the brake pipe for accelerating the rate at which the brake pipe pressure on the quick action valve device is reduced.

Another object is to provide an improved quick action valve device having means adapted upon initial movement of the valve device under a reduction in brake pipe pressure, to facilitate and insure the positive movement thereof.

A further object is to provide an improved quick action valve device having the above noted characteristics that is not responsive for effecting a local reduction in brake pipe pressure, to a flow of fluid in the brake pipe occasioned by a reduction in brake pipe pressure at a service rate or by other slight fluctuations in pressure incident to operation, but which responds rapidly to the flow of fluid in the brake pipe when an emergency rate of reduction in brake pipe pressure is initiated for effecting an emergency application of the brakes.

Figure 1:
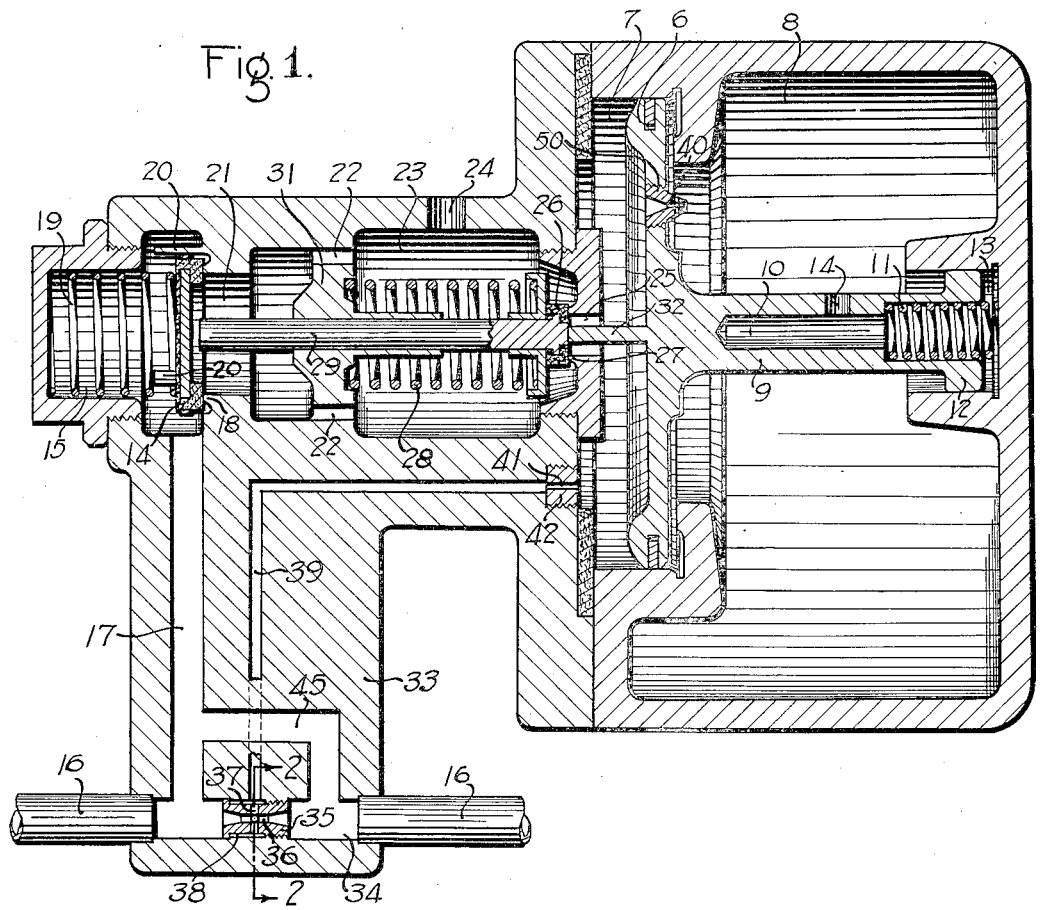
Figure 2:
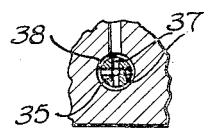

These and other objects that will be made apparent throughout the further description of the invention are attained by the quick action device hereinafter described and illustrated in the accompanying drawing, wherein Fig. 1 is a sectional view of a quick action device embodying features of the invention, and Fig. 2 is a fragmental transverse sectional view through a Venturi device, the section being taken on the line 2—2 of Fig. 1.

Referring to the drawing, the device comprises a casing containing a piston 6 having on one side a piston chamber 7 and on the other side a quick action chamber 8 in which a guide stem 9 carried by the piston is disposed, the stem being provided with a bore 10 containing a spring 11 which serves to urge the piston toward the left. The end of the stem is provided with an enlargement 12 that fits within a cylindrical recess 13 in the end wall of the casing and a passage 14 leading from the bore 10 establishes communication from the recess 13 to the chamber 8 through the bore 10 for preventing a dash-pot effect.

The piston 6 is adapted to operate through the medium of a stem 29, a brake pipe vent valve 14, contained within a chamber 15, which chamber is connected to the brake pipe 16 by a passage 17. The vent valve is urged to closed position upon a seat rib 18 by a spring 19. The valve 14 which is supported upon three guide wings 20 carried by the casing, closes communication from the chamber 15 to the chamber 21 that is connected through passages 22 to chamber 23, which in turn, is open to atmosphere through passage 24.

Communication is established from the piston chamber 7 to the chamber 23 through a bore 25 which is normally closed by a valve 26 that is urged to closed position upon a seat rib 27 by a spring 28 surrounding the valve stem 29 that is slidably mounted in guide 31.

The left end of the stem is spaced from the valve 14 when the valve 26 is in closed position and therefore the valve 26 may be moved to open position before the left end of the stem 29 engages the brake pipe vent valve 14.

A projection 32 on the piston 6 extends through the bore 25 and engages the valve 26 and serves to open the valve 26 when the piston is moved to the left and to determine the position of the piston 6 within the chamber 7 when the valve 26 is closed, the piston being urged toward the left by the spring 11 so that the projection normally engages the valve. The piston therefore, under normal conditions, occupies a definite position within the piston chamber 7 and accordingly the volumetric capacity of the quick action chamber 8 is always the same under such conditions.

The casing is provided with an extension 33 having a bore 34, therein containing a Venturi plug 35 provided with a Venturi tube or passage 36 expanding in diameter toward its ends from a relatively narrow central portion thereof. Four radial passages 37 establish communication from an intermediate portion of the passage 36 to an annular chamber 38 surrounding the plug and disposed between the walls of the bore 34 and the exterior surface of the plug.

The annular chamber 38 is connected to the piston chamber 7 through a passage 39 and a restricted passage 41 in the choke plug 42, and communication is established from the piston chamber 7 to the quick action chamber 8 through the restricted passage 40 of the choke plug 50 provided in the piston 6.

The sections of the brake pipe 16 are connected to the bore 34 in the extension 33 of the casing, and the Venturi passage 36 is aligned with the sections of the brake pipe (as shown) and is in the direct line of flow of fluid through the brake pipe. According to the well known principles of the Venturi tube, as fluid flows rapidly through the restricted central passage 36 of the tube, the pressure in the vicinity of the restricted intermediate portion of the passage is reduced. Consequently the pressure in chamber 38 and passage 39 is reduced in accordance with the rate of flow of fluid through the Venturi tube 36. A by-pass 45 is connected around the Venturi plug 35 to permit a relatively free flow of fluid through the brake pipe.

In operation, when the brake pipe is charged with fluid under pressure, assuming the parts of the vent valve device to be in the normal position as shown in the drawing, fluid flows from the brake pipe 16 through Venturi passage 36, passages 37 in the Venturi plugs, chamber 38, passage 39, restricted passage 41 to piston chamber 7 and from thence to the quick action chamber 8 through the restricted passage 40. Since the fluid flows at a relatively high velocity through the Venturi passage 36 during the charging of the brake pipe, the pressure in the passage 39 will be less than that in the brake pipe, due to the Venturi effect, and consequently the pressure build-up in the piston chamber 7 will lag behind that of the brake pipe, and this lower pressure combined with the effect of the restricted flow of fluid through the restricted passage 40, will prevent overcharging of the quick action chamber 8, which might result in undesired operation of the valves 26 and 14 when the usual brake valve (not shown) is moved from release to running position.

Fluid will also flow from the brake pipe through the passage 17 to the brake pipe vent valve chamber 15. Chambers 21 and 23, connected by passage 22, are always open to the atmosphere through the relatively large passage 24 and when the check valve 14 is open, the brake pipe is freely vented to the atmosphere through passage 17, chamber 15, chamber 21, passage 22, chamber 23 and passage 24.

When a reduction of brake pipe pressure is made at a service rate to effect a service application of the brakes, the rate of flow is relatively slow, so that the Venturi effect on the flow through passage 39 is negligible. Under such conditions, pressure on both sides of the piston 6 will remain substantially balanced because fluid flows from the quick action chamber 8 to the piston chamber 7 through the restricted passage 40 at substantially the same rate that fluid flows from chamber 7 through the restricted passage 41 to the passage 39.

Consequently, piston 6 and the quick action valve device do not operate when a reduction of brake pipe pressure is made at a service rate or when slight fluctuations of brake pipe pressure are occasioned by other causes incident to operation of the brake system.

When, however, the brake pipe pressure is reduced at an emergency rate to effect an emergency application of the brakes, the fluid in the brake pipe flows at a rapid rate through the brake pipe, causing fluid to flow rapidly through the Venturi tube 36 therein. Due to the Venturi action, the pressure in passage 39 and piston chamber 7 falls at a more rapid rate than would be the case if the piston chamber 7 were connected directly to the brake pipe.

When the fluid flows from the piston chamber 7 through restricted passage 41 at a faster rate, due to the pressure reduction in annular chamber 38, than fluid can flow from the quick action chamber 8 through the restricted passage 40, the higher pressure in the chamber 8 will move the piston to the left and open the valve 26.

The piston 6 is relatively light and of relatively large area and consequently but a slight pressure differential is required to move it and to move the valve 26 which is of small area from its seat.

When the valve 26 is opened, fluid in piston chamber 7 flows to atmosphere through bore 25, chamber 23 and atmospheric passage 24. The pressure on the left face of piston 6 is thus reduced at a rapid rate and the higher pressure in the quick action chamber 8 forces the piston further to the left with ample power to move the brake pipe vent valve 14 through the medium of the stem 29, to open position and thereby cause a rapid venting of fluid from the brake pipe 16 to the atmosphere through passage 17, chamber 15 past the brake pipe vent valve 14 to chamber 21, passages 22, chamber 23 and atmospheric passage 24.

The reduction in pressure in the piston chamber 7 due to the reduction in pressure caused by the Venturi tube is greater and at a faster rate than would be occasioned with the brake pipe directly connected to the piston chamber 7, and as a consequence, the brake pipe vent valve 14 is opened and fluid is locally vented from the brake pipe on each car with greater rapidity than is ordinarily obtained. This rapid serial venting of fluid from the brake pipe on each car through the medium of the improved quick action valve device effects equally rapid operation of the triple valve controlling application of the brake and the time usually required for applying the brakes on the rear cars of the train is materially reduced and accordingly the slack is permitted to run in without causing severe or injurious shocks.

The operation of the quick action devices disclosed is accelerated by employing a Venturi tube to amplify the rate at which the fluid pressure is reduced, but other means such as a Pitot tube may be employed for obtaining an accelerated pressure reduction for operating the piston of the quick action device by the flow of fluid through the brake pipe at an emergency rate.

While but one embodiment of the quick action device is disclosed, it is obvious that changes, omissions and additions may be made in the construction without departing from the spirit of the invention.

Having now described my invention, what I claim as new and desire to secure by Letters Patent, is:

1. In a fluid pressure brake, the combination with a brake pipe, of a quick action valve device subject to fluid pressure and operated upon a reduction in fluid pressure to vent fluid from the brake pipe, and means including a Venturi tube through which fluid in the brake pipe flows and having a passage communicating with said valve device in which the pressure is reduced by the flow of fluid through the Venturi tube for effecting a reduction of fluid pressure on said device when the brake pipe pressure is reduced at either one or the other side of said Venturi tube.

2. In a fluid pressure brake, the combination with a brake pipe, of a quick action valve device subject to fluid pressure and operated upon a reduction in fluid pressure to vent fluid from the brake pipe, means including a Venturi tube through which fluid in the brake pipe flows and having a passage communicating with said valve device in which the pressure is reduced for effecting a reduction of fluid pressure on said device upon flow of fluid in either direction in the brake pipe, and means for rendering the said device ineffective for reducing the brake pipe pressure until the pressure on the said device is reduced at a predetermined rate.

3. In a fluid pressure brake, the combination with a brake pipe, of a quick action valve device subject to fluid pressure and operated upon a reduction in fluid pressure to vent fluid from the brake pipe, and means including a Venturi tube in the brake pipe through which fluid in the brake pipe flows and having a passage communicating with said valve device in which the pressure is reduced for controlling the rate of reduction of fluid pressure on said device and having a by-pass around the said Venturi tube through which fluid in the brake pipe may flow.

4. In a fluid pressure brake, the combination with a brake pipe, of a quick action device comprising a valve operable to vent fluid from the brake pipe, a movable abutment subject to the opposing pressures of the brake pipe and a chamber normally charged with fluid under pressure and operated upon a reduction in brake pipe pressure at a predetermined rate for actuating said valve, and means operated by the flow of fluid through the brake pipe in either direction for accelerating the rate at which brake pipe pressure on said abutment is reduced.

5. In a fluid pressure brake, the combination with a brake pipe, of a valve device operated upon a reduction in brake pipe pressure for venting fluid from the brake pipe, means for accelerating the rate at which brake pipe pressure is reduced on said valve device, including a Venturi tube subject to the flow of fluid through the brake pipe for reducing the fluid pressure in said valve device, said Venturi tube having a by-pass passage permitting flow of fluid through the brake pipe around said Venturi tube.

6. In a fluid pressure brake, the combination with a brake pipe, of a quick action device comprising a valve operable to vent fluid from the brake pipe, a movable abutment subject to the opposing pressures of the brake pipe and a chamber normally charged with fluid under pressure and operated upon a pressure differential on opposite sides of the abutment for actuating said valve, means for substantially maintaining equalization of the brake pipe and chamber pressures until the rate of reduction in brake pipe pressure exceeds a predetermined value, and means actuated by the flow of fluid through the brake pipe in either direction when the fluid pressure therein is reduced, for accelerating the reduction in pressure on said movable abutment.

7. In a fluid pressure brake, the combination with a brake pipe, of a valve device operated upon a reduction in brake pipe pressure for venting fluid from the brake pipe, of means including a Venturi tube through which fluid flowing through said brake pipe passes and having a passage communicating with said valve device in which the fluid pressure is reduced by the Venturi effect of the Venturi tube upon flow of fluid therethrough in either direction, for accelerating the rate at which fluid pressure on said valve device is reduced upon reduction of the brake pipe pressure.

8. In a fluid pressure brake, the combination with a brake pipe, of a valve device operated upon a reduction in brake pipe pressure for venting fluid from the brake pipe and means including a Venturi tube through which fluid flowing through said brake pipe passes and having a passage communicating with said valve device in which fluid pressure is reduced by the flow of fluid through said Venturi tube upon flow of fluid therethrough in either direction, for accelerating the rate at which fluid is vented from said valve device to the brake pipe upon reduction of the brake pipe pressure.

9. In a fluid pressure brake, the combination with a brake pipe, of a quick action device comprising a valve operable to vent fluid from the brake pipe, a movable abutment operated upon a reduction in fluid pressure acting thereon for opening said brake pipe vent valve, means operated by flow of fluid under pressure in either direction in the brake pipe upon a reduction in brake pipe pressure for reducing the fluid pressure acting on said abutment at a rate faster than that at which the brake pipe pressure is reduced, and a valve operated upon initial movement of said abutment for venting fluid from said abutment for also reducing the fluid pressure acting thereon to accelerate the movement of said abutment.

10. In a fluid pressure brake, the combination with a brake pipe, of a quick action device comprising a valve operable to vent fluid from the brake pipe, a chamber, means operated by flow of fluid under pressure in either direction in the brake pipe upon a reduction in brake pipe pressure for reducing the pressure in said chamber at a rate faster than that at which the brake pipe pressure is reduced, a movable abutment in said chamber and operated upon a reduction in fluid pressure in said chamber for opening said brake pipe vent valve and a valve operated upon initial movement of said abutment for also venting fluid from said chamber to accelerate the movement of said abutment.

JOSEPH C. McCUNE.